United States Patent
Okamoto et al.

(10) Patent No.: US 9,095,170 B2
(45) Date of Patent: Aug. 4, 2015

(54) APPARATUS AND METHOD FOR MANUFACTURING PET FOOD

(75) Inventors: Yoshiharu Okamoto, Tottori (JP); Masayuki Tajiri, Fukuoka (JP)

(73) Assignees: National University Corporation Tottori University, Tottori-shi (JP); BCA&P. Co., Ltd., Fukuoka-shi (JP)

( * ) Notice: Subject to any disclaimer, the term of this patent is extended or adjusted under 35 U.S.C. 154(b) by 850 days.

(21) Appl. No.: 13/368,183

(22) Filed: Feb. 7, 2012

(65) Prior Publication Data
US 2012/0219675 A1 Aug. 30, 2012

(30) Foreign Application Priority Data

Feb. 8, 2011 (JP) ................................. 2011-024890

(51) Int. Cl.
*A23N 17/00* (2006.01)
*A23K 1/00* (2006.01)
*A23K 1/18* (2006.01)

(52) U.S. Cl.
CPC .............. *A23N 17/004* (2013.01); *A23K 1/003* (2013.01); *A23K 1/1846* (2013.01); *A23N 17/005* (2013.01)

(58) Field of Classification Search
CPC ............ Y01S 426/805; A23K 1/1846; A23K 1/1853; A23K 1/003; A23N 17/005; A23N 17/004
USPC ......... 426/237, 242, 448, 518, 473, 805, 630, 426/635, 640; 99/348, 451, 483, 509, 528
See application file for complete search history.

(56) References Cited

U.S. PATENT DOCUMENTS

| | | | | | |
|---|---|---|---|---|---|
| 4,464,402 | A | * | 8/1984 | Gannon | 426/242 |
| 4,547,382 | A | * | 10/1985 | Gannon | 426/482 |
| 4,632,833 | A | * | 12/1986 | Gannon | 426/242 |
| 4,895,731 | A | * | 1/1990 | Baker et al. | 426/641 |

(Continued)

FOREIGN PATENT DOCUMENTS

| | | |
|---|---|---|
| JP | 2000-125780 A | 5/2000 |
| JP | 2000-175675 A | 6/2000 |

(Continued)

OTHER PUBLICATIONS

Office Action mailed Dec. 13, 2011, issued in corresponding Japanese Patent Application No. 2011-024890, 4 pages.

*Primary Examiner* — Steven Leff
(74) *Attorney, Agent, or Firm* — Christensen O'Connor Johnson Kindness PLLC

(57) ABSTRACT

A manufacturing apparatus and a manufacturing method of pet food are provided. The manufacturing apparatus comprises a material inlet through which a kneaded material is fed, the kneaded material being obtained through kneading a raw pet food material; an extrusion molding section configured to extrude the kneaded material through an extruding outlet; a cutter configured to cut the kneaded material extruded through the extruding outlet at desired intervals to form material grains; a reservoir disposed in a location to receive the material grains falling due to the cutting; an agitating section provided in the reservoir and configured to agitate the material grains; a heating section configured to heat the material grains while the material grains are agitated by the agitating section; and a drying section configured to dry the material grains within the reservoir after the heating.

9 Claims, 2 Drawing Sheets

(56) References Cited

U.S. PATENT DOCUMENTS 5,182,127 A * 1/1993 Schwab et al. ............... 426/241
5,260,092 A * 11/1993 Gannon ....................... 426/656

FOREIGN PATENT DOCUMENTS

| JP | 2006-109746 A | 4/2006 |
| WO | 2006/001061 A1 | 1/2006 |

* cited by examiner

View From Above

View In Direction "A"

Reservoir 9 Is Put In And Taken Out With Top Lid 21 Opened

APPARATUS AND METHOD FOR MANUFACTURING PET FOOD

TECHNICAL FIELD

The present invention relates to a manufacturing apparatus of pet food and a manufacturing method of pet food, especially to a manufacturing apparatus and a manufacturing method which enable easy manufacturing of flavorful pet food at each home where a pet is fed.

BACKGROUND ART

Currently 30-40 million dogs and cats are fed in Japan. 70% or more of them eat commercially available pet food. On the one hand commercially available pet food is widely used for a reason that it has an advantage that long term storage is possible and an advantage that nutrients necessary to a pet are contained in a balanced manner, or other reasons, but on the other hand problems are pointed out that a great amount of additives such as preservative, antiseptic, antioxidant or the like are contained so that there is a risk that pet's health is impaired, and that the nutrients contained are from chemical substances.

In view of such problems, guardians are increasing who do not use commercial pet food but prepare handmade food at home. However, preparing food for a pet everyday requires great care and is not easy. Especially, though a guardian sometimes entrusts a pet to a pet hotel or an acquaintance during a travel or a business trip, it is not easy, in such a case, to prepare food for a few days or to instruct the pet hotel or the acquaintance to give properly the prepared food to the pet. As a result of such problems, many guardians tend to use commercial pet food for convenience, though they believe that handmade food is preferable for maintaining pet's health.

Incidentally, a manufacturing method of additive-free pet food is disclosed in Patent Document 1. According to this document, it is possible to manufacture pet food that can be stored as long as one year or more by combining a plurality of heating processes and cooling processes. Although the pet food manufactured by such a method is much more preferable for pet's health than pet food containing additives, it is accompanied by problems that the cost is necessarily high owing to complicated processes, and that it is difficult to vary the nutrient components, texture, taste and the like of the pet food in accordance with the health condition, constitution, and preference of individual pets, because mass production of pet food of the same kind is assumed.

Further, a manufacturing method of pet food which allows manufacturing pet food in accordance with the guardian's request is disclosed in Patent Document 2. According to the method disclosed in this document, since pet food is manufactured of materials in accordance with the guardian's request, it is possible to satisfy the health condition, constitution, or preference of individual pets to a certain degree. However, the method is implemented by a large scale apparatus disposed in a pet-related shop, so that it is necessary to go to the pet-related shop every time the pet food is required, and since no additives are included, a long-term storage is limited so that it is not practical to buy a large amount at once, which makes it necessary to go frequently to the pet-related shop and is troublesome.

PRIOR ART DOCUMENT

Patent Document

Patent Document 1: JP-A-2000-125780
Patent Document 2: WO2006/001061

SUMMARY OF THE INVENTION

Problems to be Solved by the Invention

As mentioned above, the pet food and the manufacturing methods of the same according to prior art do not necessarily satisfy the desire of guardians who wish to provide a pet with delicious and healthy meals easily, so that there is room for improvement.

The present invention is made in view of this situation, and aims to provide a manufacturing apparatus and a manufacturing method of pet food which make it possible to feed a pet with delicious and healthy meals easily.

Means for Solving the Problems

According to the present invention, a manufacturing apparatus of pet food is provided which comprises a material inlet through which a kneaded material is fed, the kneaded material being obtained through kneading a raw pet food material; an extrusion molding section configured to extrude the kneaded material through an extruding outlet; a cutter configured to cut the kneaded material extruded through the extruding outlet at desired intervals to form material grains; a reservoir disposed in a location to receive the material grains falling due to the cutting; an agitating section provided in the reservoir and configured to agitate the material grains; a heating section configured to heat the material grains while the material grains are agitated by the agitating section; and a drying section configured to dry the material grains within the reservoir after the heating.

The manufacturing apparatus of pet food of the present invention is based on the supposition that it is placed at each home where a pet is fed and capable of easily manufacturing pet food that can be stored in a refrigerator for approximately one month. Manufacturing apparatuses of pet food according to prior art are supposed to be placed in a factory or a pet-related shop for manufacturing pet food so that they are of large-scale configurations, and they were never supposed to be placed at each home. The manufacturing apparatus of pet food of the present invention is made based on the supposition that the conventional concept is broken and delicious and healthy pet food is manufactured within each home, and thus, it is so designed to easily manufacture delicious food with a simple apparatus configuration.

One of the most significant features of the present invention is to subject material grains to a heating process while agitating the material grains in a reservoir, and subsequently dry them. Many advantages are found in adopting such a method.

Firstly, since the heating process is performed within a reservoir, a heating process in advance is not required. Though some apparatuses of prior art perform a heating process of a material before molding by means of an extruder, it is bothersome to conduct such a process at home, and a large amount of power is required by the extrusion if components deriving from meat solidify owing to heating, so that the extruder tends to grow in size, which makes the apparatus unsuitable to be placed at each home.

Secondly, since the heating process is performed on small grains of material, the temperature difference between the surface and the inside is small, so that even heating is possible. In some of the apparatuses of prior art, where a heating process is performed on large lumps of material, heating by the heating process tends to be uneven if agitation during the heating process is not sufficient. Although optimization of conditions of the heating process is possible if the heating process is performed under a circumstance severely controlled in a factory on a same material every time, optimization of conditions of the heating process is not easy in an apparatus placed at home, as that of the present invention, and moreover when the composition of the material varies in accordance with the health condition of a pet. Therefore, it is very important to perform the heating process on small grains of material in a manufacturing apparatus of pet food for home use.

Thirdly, since drying is performed within a reservoir, downsizing of the apparatus is possible. Though some apparatuses of prior art heat material grains while moving the material grains on a conveyer in order to dry them, it is difficult, with this configuration, to downsize the apparatus.

As mentioned above, the apparatus according to the present invention is capable of manufacturing delicious pet food easily with a simple and small sized apparatus configuration, since material grains are subjected to a heating process while the material grains are agitated in a reservoir, and subsequently dried.

Further, the apparatus of the present invention also offers the following advantages:

- Food can be made of safe and secure materials of a guardian's choice.
- Dry food can be made that contains no antioxidant, antiseptic or chemical substance and thus is good for the body of a pet.
- Storage in a refrigerator as long as one month is possible.
- Since favorite materials (meat, fish) can be used, not only preference or allergy of a pet can be dealt with but also variations can be widened easily (nutritional bias can be prevented).
- By preparing a cookbook, food can be easily made without wondering about selection and composition of materials.
- By preparing a cookbook taking care of a disease, a pet can be fed with food that is good for the body and enhances therapeutic effect, so that it is not necessary to rely on commercial therapeutic food products, which are expensive but low in palatability.
- By varying the size of the grains, ease of eating of the food can be controlled in accordance with the size of the body.
- By adjusting the amount of meat and fish, the food can be fed together with other handmade food (heated or unheated).
- By varying dryness factor, flavor of a raw material can be adjusted to preference, so that a pet of faddy eating can be dealt with.
- A snack such as cookies can be also made.
- The apparatus can be operated with the electric power source at home.
- Affection for a pet is enhanced through the meal.
- A child can be taught of preciousness of life through treating an animal as not an article but as a family member.

EMBODIMENTS FOR CARRYING OUT THE INVENTION

Figure 1:
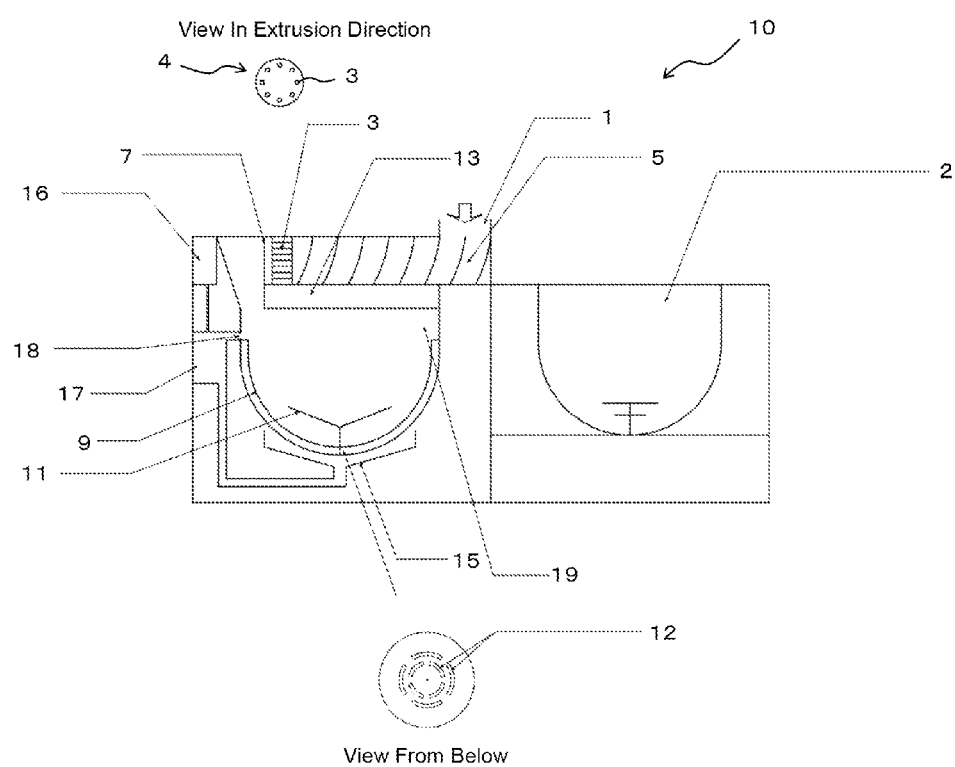
FIG. 1 is a front view illustrating a configuration of a manufacturing apparatus of pet food according to an embodiment of the present invention.
Figure 2:
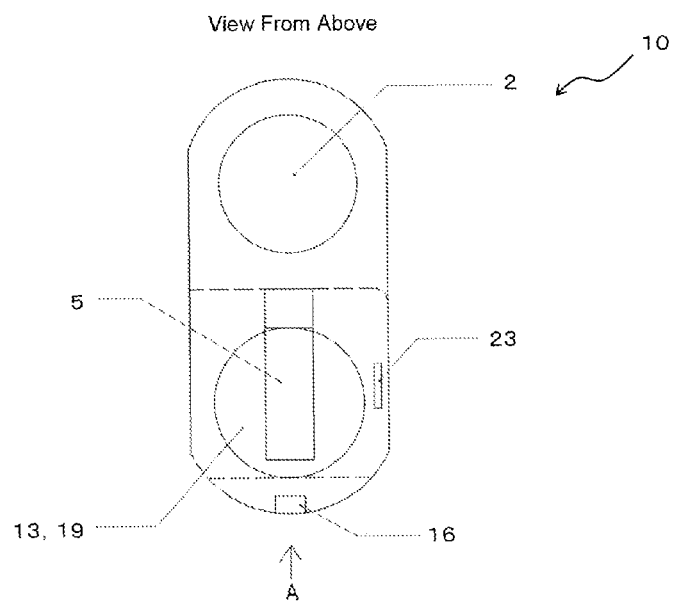
FIG. 2 is a top view illustrating the manufacturing apparatus of pet food shown in FIG. 1.
Figure 3:
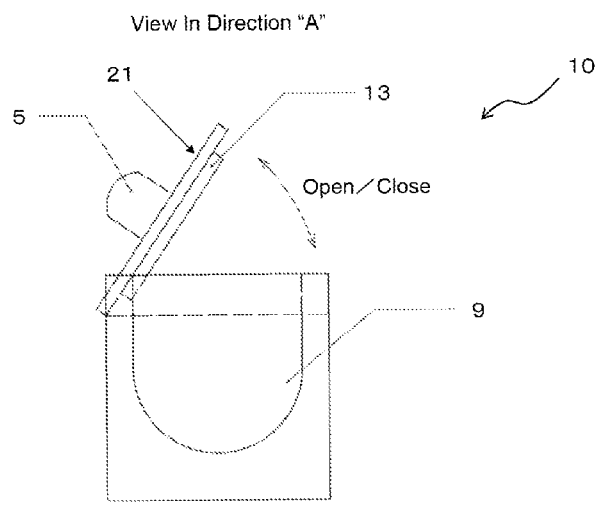
FIG. 3 is a view seen in the direction of the arrow A in FIG. 2.

A manufacturing apparatus 10 of pet food according to an embodiment of the present invention and a manufacturing method of pet food using the apparatus will be described with reference to FIGS. 1 to 3. The manufacturing apparatus 10 of pet food of the embodiment comprises a material inlet 1 through which a kneaded material is fed, the kneaded material being obtained through kneading a raw pet food material, an extrusion molding section 5 configured to extrude the kneaded material through an extruding outlet 3, a cutter 7 configured to cut the kneaded material extruded through the extruding outlet 3 at desired intervals to form material grains, a reservoir 9 disposed in a location to receive the material grains falling due to the cutting, an agitating section 11 configured to agitate the material grains in the reservoir 9, a heating section 13 configured to heat the material grains while the material grains are agitated by the agitating section 11, and a drying section 19 configured to dry the material grains within the reservoir after the heating. Further, the apparatus 10 optionally comprises a brewis recovering section 15 configured to recover brewis which has been generated from the material grains during the heating and has passed through an opening 12, and a spraying section 17 configured to spray the brewis recovered by the brewis recovering section 15 onto the material grains being agitated in the reservoir.

Hereafter, each of these components will be described.

(1) Preparation of Kneaded Material

Firstly, raw pet food materials are kneaded to prepare the kneaded material. The raw pet food materials can be arbitrarily selected by a guardian from among meat (such as beef, pork and chicken), fish, vegetable, fruit, cereal or the like in accordance with the preference or the health condition of a pet. The raw pet food materials preferably produce brewis during a heating process, and thus preferably include meat. Though the content of meat in the pet food materials is not specifically limited but can be changed in accordance with the preference or the health condition of the pet; it is, for example, 1 to 100% by weight, and preferably 10 to 80% by weight. This is because when the content of meat is too low, an amount of the brewis is insufficient, and when the content of meat is too high, nutritional balance is sometimes lost. Specifically, the content of meat is 1, 5, 10, 20, 30, 40, 50, 60, 70, 80, 90 or 100% by weight, and may also be between any two values among the exemplary values listed here.

Kneading of the raw pet food materials may be performed using a machine (hereafter, referred to as a "kneading machine") 2 capable of kneading the raw materials, such as a food processor and a mixer, or may be performed by hand working. The kneading machine may be either unified with or separated from the apparatus 10. Further, the kneading machine may be one that is sold together with the apparatus 10, or may be a food processor or a mixer of general use which is purchased independently of the apparatus 10. Moreover, a configuration may be adopted where the kneaded material obtained by kneading is fed automatically to the material inlet 1, or the kneaded material may be fed by hand working to the material inlet 1. In a preferred embodiment, relatively large sized materials such as meat, fish, vegetable and fruit are pulverized first using a food processor, and subsequently cereals (boiled rice or the like), oil and others are added and they are mixed together by a mixer. Thus, by using both a food processor and a mixer, it is possible to obtain a kneaded material in which finely pulverized materials are evenly mixed. Therefore, the kneading machine is preferably equipped with both a function of pulverizing raw pet food materials and a function of mixing them.

(2) Preparation of Material Grains

Next, material grains are prepared using the kneaded material. To be specific, the kneaded material is fed through the material inlet 1 of the extrusion molding section 5, and the extrusion molding section 5 is activated to extrude the kneaded material through the extruding outlet 3. The kneaded material to be fed into the extrusion molding section 5 is preferably uncooked. This is because, in this case, more brewis can be obtained at a heating step to be described, and because time and effort for pretreatment can be saved. The operation principle of the extrusion molding section 5 to extrude the kneaded material is not specifically limited, and thus, may be any method that is capable of extruding the kneaded material, so that an extruder of a screw type can be employed as the extrusion molding section 5. The shape of the extruding outlet 3 is not limited specifically, and may be, for example, circular, rectangular, star or the like. When the shape of the extruding outlet 3 is star, it is possible to reduce time required in a heating step or a drying step because the surface area of side surfaces of the material grain becomes large. Further, the shape of the extruding outlet 3 may be made into a ring so as to prepare material grains having a tubular shape. Also in this case, the surface area of side surfaces of the material grain becomes large, so that the time required in the heating step or the drying step can be reduced. The diameter of the extruding outlet 3 (if not a circle, the diameter of a circumscribing circle) is preferably 1 to 20 mm, and more preferably 2 to 10 mm. In a case of too small a diameter, the size of the opening 12 provided in the bottom of the reservoir 9 must be made further smaller, so that it is difficult for the brewis to pass through the opening 12. In a case of too large a diameter, it is difficult for the pet to eat the food. The number of the extruding outlet 3 is not limited specifically, and thus, may be one or plural (for example, four to twelve); in an example, a plurality of extruding outlets 3 are arranged on the circumference of a circle at equal distances therebetween as shown in FIG. 1. Further, the extruding outlet 3 is preferably provided in an extruding outlet member of a cartridge 4, and therefore, if a plurality of extruding outlet members having an extruding outlet 3 different in shape are made ready, it is easy to change the shape of the extruding outlet 3 by replacing the extruding outlet members.

The kneaded material having been extruded through the extruding outlet 3 has a long and thin shape, and can be formed into material grains having a grain-like shape by cutting with the cutter 7 at desired intervals. The configuration of the cutter 7 is not limited specifically, and it may be a rotary cutter or a vertical motion cutter. The length of the material grain is not limited specifically, and is, for example, 20 to 500% of the diameter of the extruding outlet 3. If the length of the material grain is 20 to 80% of the diameter of the extruding outlet 3, material grains of a flat shape are obtained. If the length of the material grain is 80 to 120% of the diameter of the extruding outlet 3, material grains of a blockish shape are obtained. If the length of the material grain is 120 to 500% of the diameter of the extruding outlet 3, material grains of a long-and-thin shape are obtained. The length of the material grains can be arbitrarily selected in accordance with, for example, the preference of the pet.

The material grains formed fall down due to gravitational force, but because the reservoir 9 is disposed below the cutter 7, the material grains falling down are collected within the reservoir 9.

(3) Processes of Heating and Drying Material Grains

The material grains in the reservoir 9 are heated by the heating section 13, which is disposed at a position suitable to heat the material grains in the reservoir 9. An example of the heating section 13 is a microwave radiation apparatus, which is disposed above the reservoir 9 and capable of radiating a microwave toward the material grains in the reservoir 9. The microwave radiation apparatus is preferable in that the material grains can be heated rapidly and evenly. Further, the heating section 13 may be another kind of heater, which heats the material grains from above the reservoir 9, for example, a steam convection apparatus which heats the material grains with high temperature steam. Moreover, the heating section 13 may be one that heats the material grains by heating the reservoir 9, and, in this case, the heater can be disposed below the reservoir 9. If the heating section 13 is a microwave radiation apparatus, it is preferable to enclose the heating section 13, the reservoir 9 and the like in a sealed housing in order to prevent leakage of the microwave. Also, it is preferable to provide a cover so as to cover the extruding outlet 3 in order to prevent the microwave from leaking through the extruding outlets 3, or to cover the material inlet 1.

The material grains are agitated by the agitating section 11 while being heated. Due to the agitation, even heating of the material grains is possible. The agitating section 11 may be, as shown in FIG. 1, one that is disposed inside the reservoir 9 to agitate the material grains (e.g., an agitator blade), or one that agitates the material grains by rotating, oscillating, vibrating or otherwise affecting the reservoir 9. In the former case, efficient agitation is possible since the agitating section 11 directly touches and agitates the material grains. In the latter case, agitation of the material grains is possible without the need of disposing something like the agitator blade within the reservoir 9, so that it is easy to take the material grains out of the reservoir 9, and it is also easy to wash the reservoir 9.

When the material grains are heated by the heating section 13, brewis comes out of the material grains. In a case where no opening is provided at the bottom of the reservoir 9, the brewis is agitated together with the material grains by the agitating section 11 so that the brewis adheres to the surface of the material grains evenly.

In a case where the opening 12 is provided at the bottom of the reservoir 9, the brewis coming out of the material grains falls through the opening 12 provided at the bottom of the reservoir 9, and recovered by the brewis recovering section 15 which is disposed below the reservoir 9. The opening 12 may have any shape that does not allow the material grains to fall, and is, for example, of a circular or slit-like shape. With a slit-like shape, it is easy to make the cross-sectional area large, so that the opening 12 preferably has a slit-like shape. The width of the slit must be smaller than the diameter of the extruding outlet 3 in order to prevent the material grains from falling, and is preferably 80% or less of the diameter of the extruding outlet 3. Further, if the width of the slit is too small, it is difficult for the brewis to pass through the slit, and thus, the width of the slit is preferably 20% or more of the diameter of the extruding outlet 3.

The brewis recovered by the brewis recovering section 15 is sprayed from a spray nozzle 18 of the spraying section 17 onto the material grains from above of the material grains. Since the material grains are being agitated by the agitating section 11 during the spraying, the sprayed brewis adheres evenly to the material grains. The method of raising the brewis from the brewis recovering section 15 to the spraying section 17 is not limited specifically, and thus, the brewis may be raised to the spraying section 17 by creating a pressure difference between the brewis recovering section 15 and the spraying section 17 using a pump or the like, or may be raised with use of the siphon principle. When adhering of the brewis is performed by spraying, since the brewis is sprayed from above the material grains, it is possible to cause the brewis to adhere evenly onto the material grains.

The spraying of the brewis may be performed during the heating of the material grains, or after completion of the heating of the material grains. If the spraying is performed during the heating of the material grains, an advantage is obtained that the brewis blends in to the material grains. Also, if the spraying is performed after completion of the heating of the material grains, an advantage is obtained that the amount of the brewis adhering to the surface the material grains is large. When the brewis is present in a high concentration on the surface of the material grains, smell of the brewis is easily diffused so that olfaction of the pet is stimulated, whereby appetite of the pet is easily enhanced. Further, since the surface of the material grains is the part which the tongue of the pet touches first, when the brewis is present in a high concentration on the surface of the material grains, olfaction of the pet is stimulated so that appetite of the pet is easily enhanced.

Though the brewis as recovered may be caused to adhere to the material grains, if the quantity of the brewis is small or addition of another flavor to the brewis is desired, oil supplied from an oil container 16 may be added to the brewis before the brewis is sprayed onto the material grains. In this case, it is possible to make the brewis adhere more evenly to the material grains. As the oil, vegetable oil such as olive oil and sunflower seed oil is desirable in the light of flavor and the like. The oil to be mixed with the brewis is contained in the oil container 16 disposed adjacent to the spraying section 17, and replenished when the remaining level gets low.

The material grains sprayed with the brewis is dried by the drying section 19. The configuration of the drying section 19 is not limited specifically provided that it can dry the material grains, and thus, the drying section 19 may be an apparatus which dries the material grains by blowing air of 50 to 100° C. onto the material grains, for example. The temperature of the air is preferably 70 to 80° C. This is because, when the temperature of the air is too low, too long a time is required for drying, and when the temperature of the air is too high, adjustment of the moisture content after drying is difficult, and situations sometimes arise where the flavor of the material grains is degraded or the nutrients are destroyed. The moisture content after drying is preferably 5 to 15% by weight, since the texture is especially good with such moisture content.

The manufacturing apparatus 10 of pet food is provided with a top lid 21 that is openable and closable, and the material grains within the reservoir 9 is accessible by opening the top lid 21, which enables taking the material grains out of the reservoir 9 to use them as pet food. The top lid 21 is preferably provided with a handle 23 for opening and closing, such that it is possible to open the top lid 21 easily with use of the handle 23. It is preferable that the reservoir 9 is configured to be detachably attached, which facilitates taking out the material grains and washing the reservoir 9. Further, it is preferable that the agitating section 11 in the reservoir 9 is configured to be separable from the reservoir, which further facilitates taking out the material grains and also facilitates washing the agitating section 11.

In the manufacturing method of pet food according to this embodiment, since the heating process is applied to the material grains which are small in size, unevenness in heating is suppressed, so that thermal sterilization of the material grains are ensured. Therefore, the pet food obtained by the method according to this embodiment is supposed to be capable of storage in a refrigerator for approximately one month, despite the fact that no additives such as preservative or the like are contained.

DESCRIPTION OF REFERENCE NUMERALS

1 . . . material inlet
2 . . . kneading machine
3 . . . extruding outlet
4 . . . cartridge
5 . . . extrusion molding section
7 . . . cutter
9 . . . reservoir
10 . . . manufacturing apparatus of pet food
11 . . . agitating section
12 . . . opening
13 . . . heating section
15 . . . brewis recovering section
16 . . . oil container
17 . . . spraying section
18 . . . spray nozzle
19 . . . drying section
21 . . . top lid
23 . . . handle for opening and closing

The invention claimed is:

1. A manufacturing apparatus of pet food, comprising:
a material inlet through which a kneaded material is fed, the kneaded material being obtained through kneading a raw pet food material;
an extrusion molding section configured to extrude the kneaded material through an extruding outlet;
a cutter configured to cut the kneaded material extruded through the extruding outlet at desired intervals to form material grains;
a reservoir disposed in a location to receive the material grains falling due to the cutting;
an agitating section configured to agitate the material grains in the reservoir;
a heating section configured to heat the material grains while the material grains are agitated by the agitating section; and
a drying section configured to dry the material grains within the reservoir after the heating.

2. The manufacturing apparatus of pet food of claim 1, further comprising a kneading machine configured to knead the raw pet food materials to produce the kneaded material to be fed through the material inlet.

3. The manufacturing apparatus of pet food of claim 1, wherein the heating section heats the material grains by means of microwave radiation.

4. The manufacturing apparatus of pet food of claim 1, further comprising:
a brewis recovering section configured to recover brewis which has been generated from the material grains during the heating and has passed through an opening at a bottom of the reservoir; and
a spraying section configured to spray the brewis recovered by the brewis recovering section onto the material grains being agitated in the reservoir.

5. The manufacturing apparatus of pet food of claim 4, further comprising an oil container configured to contain oil to be mixed with the brewis recovered by the brewis recovering section, wherein the spraying section sprays the brewis mixed with the oil.

6. A manufacturing method of pet food, comprising the steps of:
kneading a raw pet food material to produce a kneaded material;
feeding the kneaded material to an extrusion molding section having an extruding outlet and extruding the kneaded material through the extruding outlet;
cutting the kneaded material extruded through the extruding outlet at desired intervals to form material grains;
receiving the material grains into a reservoir disposed in a location to receive the material grains falling due to the step of cutting;
heating the material grains while agitating the material grains in the reservoir; and
drying the material grains within the reservoir after the step of heating.

7. The manufacturing method of pet food of claim 6, further comprising the steps of:
recovering brewis which has been generated from the material grains during the step of heating and has passed through an opening at a bottom of the reservoir; and
spraying the recovered brewis onto the material grains being agitated in the reservoir.

8. The manufacturing method of pet food of claim 7, further comprising, before the spraying step, a step of mixing the brewis recovered by a brewis recovering section with oil.

9. The manufacturing method of pet food of claim 6, wherein the step of drying is performed such that a resultant amount of water in the material grains is 5% to 15%.

* * * * *